Patented Apr. 14, 1953

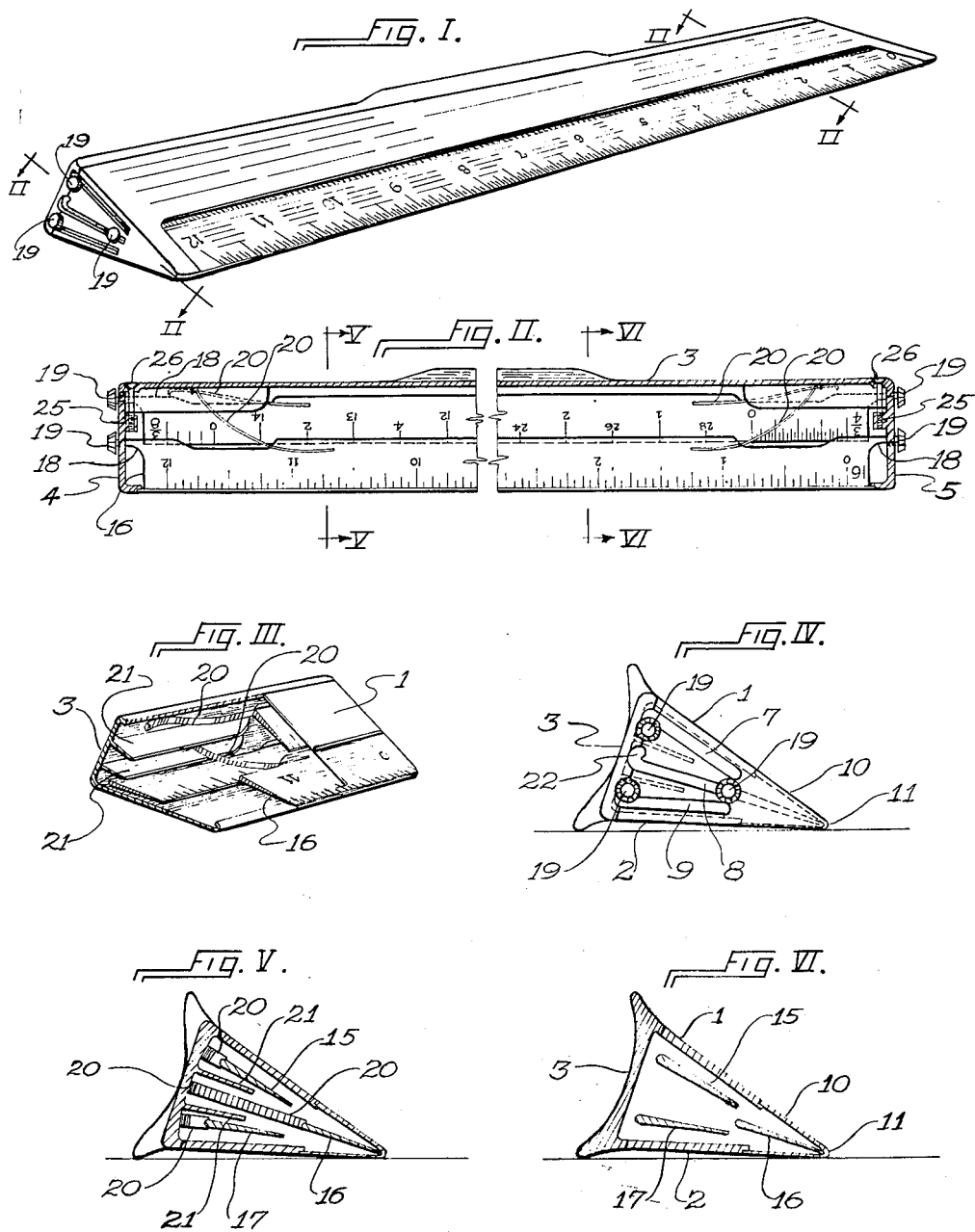

2,634,504

UNITED STATES PATENT OFFICE 2,634,504

DRAFTSMAN'S SCALE

Roscoe C. Jennings, Jr., Coraopolis, Pa.

Application September 30, 1952, Serial No. 312,358

5 Claims. (Cl. 33—107)

This invention relates to draftsmen's scales, the conventional form of which is a body of wood or other material, whose cross-section is an equilateral triangle. The various scales, which are fractions or multiples of an inch, such as ⅛, ¼, ⅜, ½, 1½, etc., are marked on edge portions of the faces of both sides of the scale that form each of the three apices of the scale.

Such scales cannot be used extensively as straight edges for drawing lines, because such use mars the edges of the scale and the scale markings adjacent to the edges. This means uses the scale for indicating, by dots, the lengths of lines to be drawn, and then picks up a triangle or other form of straight edge to draw the line. Furthermore, because of their symmetry, conventional scales are difficult to keep so positioned that the proper scale for a drawing that is being made is continually and readily apparent to the draftsman.

The object of this invention is to provide a draftsman's scale in which a plurality of strip-like scales are so mounted for reciprocation in a casing that one or another of the strips may be independently and easily moved to its useable position, in which it is visible through a transparent window portion of the casing at an edge of it, the scale structure being such that it may be used as a straight edge without impairing the scale markings.

The invention is illustrated in the accompanying drawing of which Fig. 1 is a perspective view of a scale embodying the invention; Fig. 2 a longitudinal sectional view, the plane of view being indicated by the line II—II on Fig. 1; Fig. 3 an isometric view of a portion of the scale, a part of the casing being cut away to show spring mechanism for moving scale strips; Fig. 4 a left end view of the scale; Fig. 5 a transverse sectional view taken on the line V—V of Fig. 2; and Fig. 6 a sectional view taken on the line VI—VI of Fig. 2.

Having reference to the drawings, the draftsman's scale comprises an elongate casing having like sides 1 and 2, and a base 3, the base being detachable from the side portions of the casing. The casing is formed of sheet-like material, and in cross-section is generally the shape of an isosceles triangle, although it is unnecessary to have the base 3 of flat or plane configuration. At its opposite ends the casing is provided with end walls 4 and 5, each of which is provided with a series of slots 7, 8 and 9, the number of such slots depending upon the number of scale strips with which the casing is provided. The casing is made of sheet-like material, base 3 and the portions of sides 1 and 2 adjacent to the base being preferably formed of sheet metal, although they may be formed of opaque plastic material. The portion 10 of the casing forming the apex 11 of the scale is preferably shaped in V-shaped form, and is made of transparent material, such as plastic, to provide windows for the scale strips presently to be explained.

Depending upon the number of fractional or multiple scales desired to be used, the interior of the casing is provided with a plurality of sheet-like strips having different scale markings on their faces. As shown in the drawings, the casing is provided with three such strip-like scales 15, 16 and 17, each of which extends in a general radial direction from the apex 11 of the scale. As shown particularly in Fig. 2, the ends of the scale strips are provided with projections 18 which extend through the slots 7, 8 and 9 in the ends of the casing. For convenience in manipulating the scale strips, the end of each projection 18 is conveniently provided with a small knob 19 at the outsides of the ends 4 and 5.

Each of the scale strips 15, 16 and 17 is yieldingly pressed towards the apex 11 of the scale. For this purpose, leaf springs 20 are preferably used at both ends of each scale strip, one end of each spring being attached to the rear edge portion of each scale strip, and the other end of each such spring bearing upon the removable base 3 of the casing. Between the center scale strip 16 and the adjacent or side scale strips 15 and 17, the casing base is provided with spacers 21 which separate the scale strips from each other as well as the springs attached to the opposite ends of each scale strip, and, with the base, form tracks for the springs. A side wall of each of the slots 7, 8 and 9 in the casing ends 4 and 5 is provided with a lateral offset 22 for receiving and holding projection 18 at an end of a scale strip, the scale strips not in use being thus held in retracted positions against the pressure of springs 20.

For attaching base 3 of the casing to its sides 1 and 2, and its ends 4 and 5, the ends may be provided with inwardly extending bosses 25 that are threaded to receive screws 26 that extend through base 3. This detachability of base 3 is convenient in the assembly of the scale strips within the casing, and, when it is desired to substitute one or more scale strips for those originally placed in the casing, this may be easily done by removing back 3. The center portion of base 3 is preferably provided with outwardly flaring grips 27 for convenience in manipulating the scale.

Summarizing the construction and operation of the embodiment of the invention illustrated in the drawing, the scale which is in the general form of an isosceles triangle in cross-section, comprises sides 1 and 2, a base 3 and ends 4 and 5, the casing being formed of sheet-like material. The apex portion 10 is made of transparent material in V form to afford a window for scale strips. Within the casing there are three scale strips 15, 16 and 17, the center strip 16 being shown in all of the figures as being in its forward or apex position having its forward end pressed against the sharply rounded portion of the transparent section 10 of the casing. In this position of the scale strips, the side strips 15 and 17 are retained in their retracted positions by the engagement of their end projections 18 by offsets 22 at the rear ends of slots 7 and 9 in both of the ends 3 and 4, and in that position they are yieldingly pressed forward by leaf springs 20 as shown in Figs. 2 and 3.

To change the scale strips, the knobs 19 at the ends of strips 16 are moved rearwardly to engage the lateral offsets 22 at the ends of slots 8, and thereafter the knobs 19 at the ends of one or the other of scale strips 15 and 16 are disengaged from offsets 22 to permit the backing springs 20 to press the scale strip to its forward position. The apex-forming section 10 being rather sharply rounded, magnifies the edge of the strip, giving it the appearance of being very close to the edge of apex 11. The forward edge of the scale strip being protected by the end of the window-forming portion 10, makes it possible to use the scale as a straight edge without marring the scale, thus avoiding the necessity of using a straight edge for drawing lines.

According to the provisions of the patent statutes, I have explained the principle and mode of operation of my invention, and have illustrated and described what I now consider to be its best embodiment. However, I desire to have it understood that, within the scope of the appended claims, my invention may be practiced otherwise than as illustrated and described.

I claim:

1. A draftman's scale comprising an elongate casing having two like sides and a base and being generally the shape of an isosceles triangle in cross-section, and having end closures, the casing being formed of sheet-like material and portions of its sides that form its apex being transparent, each end of the casing being provided with a plurality of slots that extend in a general radial direction from the apex of the casing, the wall of each slot being provided with a lateral offset, and a plurality of sheet-like strips within the casing having different scale markings on their faces, said scale strips extending substantially from end to end of the casing and each being provided at its ends with a projection that extends through one of said end slots, each of said scale strips being yieldingly pressed towards the apex of the casing, and being adapted to be held in a retracted position adjacent to the casing base through engagement of said end projections by said slot offsets.

2. A draftsman's scale comprising an elongate casing having two like sides and a detachable base and being generally the shape of an isosceles triangle in cross-section, and having end closures, the casing being formed of sheet-like material and having portions of its sides that constitute its apex formed of V-shaped transparent material to form scale windows, each end of the casing being provided with a plurality of slots that extend in a general radial direction from the apex of the casing, the wall of each slot being provided with a lateral offset, and a plurality of sheet-like strips within the casing having different scale markings on their faces, said scale strips extending substantially from end to end of the casing and each being provided at both of its ends with a projection that extends through one of said end slots, each of said scale strips being yieldingly pressed towards the apex of the casing, and being adapted to be held in a retracted position adjacent to the casing base through engagement of said end projections by said slot offsets.

3. A draftsman's scale comprising an elongate casing having two like sides and a base and being generally the shape of an isosceles triangle in cross-section, and having end closures, the casing being formed of sheet-like material and portions of its sides that form its apex being transparent, each end of the casing being provided with a plurality of slots that extend in a general radial direction from the apex of the casing, the wall of each slot being provided with a lateral offset, a plurality of sheet-like strips within the casing having different scale markings on their faces, said scale strips extending substantially from end to end of the casing and each being provided at its ends with a projection that extends through one of said end slots, and a spring positioned between said casing base and the rear edge, each of said scale strips yieldingly to press the strip towards the apex of the casing, each of said scale strips being adapted to be held in a retracted position adjacent to the casing base through engagement of said end projections by said slot offsets.

4. A draftsman's scale comprising an elongate casing having two like sides and a detachable base and being generally the shape of an isosceles triangle in cross-section, and having end closures, the casing being formed of sheet-like material and portions of its sides that form its apex being transparent, each end of the casing being provided with a plurality of slots that extend in a general radial direction from the apex of the casing, the wall of each slot being provided with a lateral offset, a plurality of sheet-like strips within the casing having different scale markings on their faces, said scale strips extending substantially from end to end of the casing and each being provided at its ends with a projection that extends through one of said end slots, and a leaf spring attached at one end to the rear edge of each of said scale strips and bearing at its other end against said casing base yieldingly to press each strip towards the apex of the casing, each of said scale strips being adapted to be held in a retracted position adjacent to the casing base through engagement of said end projections by said slot offsets.

5. A draftsman's scale comprising an elongate casing having two like sides and a detachable base and being generally the shape of an isosceles triangle in cross section, and having end closures, the casing being formed of sheet-like material and having portions of its sides that constitute its apex formed of V-shaped transparent material to form scale windows, each end of the casing being provided with a plurality of slots that extend in a general radial direction from the apex of the casing, the wall of each slot being provided with a lateral offset at its rear end, a plurality of sheet-like strips within the casing having different scale markings on their faces, said scale strips extending substantially from end to end of the casing and each being provided at its ends with a projection that extends through one of said end slots, spacing bars borne by the casing for separating said scale strips from each other, and a pair of leaf springs attached to the rear edge of each of said scale strips near its ends and bearing their other ends against said casing base yieldingly to press each strip towards the apex of the casing, said scale strips being adapted to be held in a retracted position adjacent to the casing base through engagement of said end projections by said slot offsets.

ROSCOE C. JENNINGS, Jr.

No references cited.